(12) United States Patent
Ishikawa

(10) Patent No.: US 10,788,115 B2
(45) Date of Patent: *Sep. 29, 2020

(54) STRAIN WAVE GEARING WITH FULL SEPARATION OF TWO STRESSES

(71) Applicant: HARMONIC DRIVE SYSTEMS INC., Shinagawa-ku, Tokyo (JP)

(72) Inventor: Shoichi Ishikawa, Yokohama (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 248 days.

This patent is subject to a terminal disclaimer.

(21) Appl. No.: 16/068,383

(22) PCT Filed: Jan. 15, 2016

(86) PCT No.: PCT/JP2016/051190
§ 371 (c)(1),
(2) Date: Jul. 6, 2018

(87) PCT Pub. No.: WO2017/122362
PCT Pub. Date: Jul. 20, 2017

(65) Prior Publication Data
US 2019/0003569 A1 Jan. 3, 2019

(51) Int. Cl.
*F16H 55/08* (2006.01)
*F16H 49/00* (2006.01)

(52) U.S. Cl.
CPC ....... *F16H 55/0833* (2013.01); *F16H 49/001* (2013.01); *F16H 2049/003* (2013.01)

(58) Field of Classification Search
CPC .......................... F16H 55/0833; F16H 49/001
See application file for complete search history.

(56) References Cited

U.S. PATENT DOCUMENTS

| 2,906,143 | A | 9/1959 | Musser | |
|---|---|---|---|---|
| 2007/0180947 | A1* | 8/2007 | Ishikawa | F16H 55/0833 74/640 |
| 2009/0044651 | A1* | 2/2009 | Yamamori | B62D 5/008 74/461 |
| 2010/0319484 | A1* | 12/2010 | Kanai | F16H 55/0833 74/640 |

(Continued)

FOREIGN PATENT DOCUMENTS

| JP | S45-041171 A | 12/1970 |
|---|---|---|
| JP | 63-115943 A | 5/1988 |

(Continued)

OTHER PUBLICATIONS

International Search Report (PCT/ISA/210) dated Apr. 12, 2016, by the Japanese Patent Office as the International Searching Authority for International Application No. PCT/JP2016/051190.

(Continued)

*Primary Examiner* — Terence Boes
(74) *Attorney, Agent, or Firm* — Buchanan Ingersoll & Rooney PC

(57) ABSTRACT

In a strain wave gearing, the addendum tooth profile of an internal gear is defined by the formula a and that of an external gear is by the formula b at a principal cross-section located at a tooth-trace-direction center of the external gear, on the basis of a movement locus (Mc) of $\kappa=1$ of the teeth of the external gear with respect to those of the internal gear in the principle cross-section taken at the center of the tooth trace of the external gear obtained when the tooth meshing is approximated by rack meshing. It is possible to avoid superimposition of flexion-induced bending stresses and tensile stresses caused by load torque at the major-axis locations of the external gear, and the transmission torque capacity of a strain wave gearing can be improved.

6 Claims, 12 Drawing Sheets

(56) References Cited

U.S. PATENT DOCUMENTS

| | | | | |
|---|---|---|---|---|
| 2011/0154928 A1* | 6/2011 | Ishikawa | ............. | F16H 55/0833 |
| | | | | 74/461 |
| 2011/0237382 A1* | 9/2011 | Ishikawa | ............. | F16H 55/0833 |
| | | | | 475/180 |
| 2012/0285283 A1* | 11/2012 | Ishikawa | ............. | F16H 55/0833 |
| | | | | 74/461 |
| 2014/0047937 A1* | 2/2014 | Ishikawa | ............. | F16H 55/0833 |
| | | | | 74/412 R |
| 2014/0251048 A1* | 9/2014 | Ishikawa | ............... | F16H 49/001 |
| | | | | 74/413 |
| 2017/0159789 A1* | 6/2017 | Ishikawa | ................. | F16H 55/08 |
| 2018/0347679 A1* | 12/2018 | Ishikawa | ............... | F16H 49/001 |
| 2019/0003569 A1* | 1/2019 | Ishikawa | ............... | F16H 49/001 |

FOREIGN PATENT DOCUMENTS

| | | |
|---|---|---|
| JP | 64-79448 A | 3/1989 |
| JP | 2007-211907 A | 8/2007 |
| JP | 4165810 B2 | 10/2008 |
| JP | 4650954 B2 | 3/2011 |
| JP | 5456941 B1 | 4/2014 |
| WO | 02/079667 A1 | 10/2002 |

OTHER PUBLICATIONS

Written Opinion (PCT/ISA/237) dated Apr. 12, 2016, by the Japanese Patent Office as the International Searching Authority for International Application No. PCT/JP2016/051190.

\* cited by examiner

STRAIN WAVE GEARING WITH FULL SEPARATION OF TWO STRESSES

TECHNICAL FIELD

The present invention relates to a strain wave gearing, in which a flexible external gear is made to flex into an ellipsoidal shape by a wave generator and to partially mesh with a rigid external gear. More specifically, the invention relates to a strain wave gearing for improving the transmission torque capacity thereof by avoiding superimposition of bending stress and tensile stress in sections at either end of the major axis of the ellipsoidal shape of the external gear, in which the bending stress is produced due to flexion and the tensile stress is caused by load torque due to meshing with the internal gear.

BACKGROUND ART

A strain wave gearing typically has a rigid internal gear, a flexible external gear coaxially arranged inside the internal gear, and a wave generator fitted into the external gear. A flat-type strain wave gearing is provided with an external gear having external teeth formed on an outer peripheral surface of a flexible cylinder. The external gear of a cup-type or top-hat-type strain wave gearing is provided with a flexible cylindrical body part, a diaphragm extending in a radial direction from a back end of the cylindrical body part, and external teeth formed in an outer peripheral surface section at the front-end opening side of the cylindrical body part. In a typical strain wave gearing, a circular external gear is ellipsoidally flexed by a wave generator, and sections at either end of the major axis of the ellipsoidally-flexed external gear mesh with an internal gear.

Since the invention of the strain wave gearing by its creator, C. W. Musser (Patent document 1), up to the present day, various inventions based on the present device have been contrived by numerous researchers, including Mr. Musser, and the present inventor. Even limiting the scope to inventions relating to tooth profile, various inventions devised. The present inventor, in Patent document 2, proposed to adopt an involute tooth profile as the basic tooth profile, and in Patent documents 3 and 4 proposed a tooth profile design method for deriving addendum tooth profiles of an internal gear and an external gear for wide-area contact, using a process of approximating meshing of the two gears by rack meshing.

In strain wave gearings, a flexible external gear is flexed from a true circular state to an ellipsoidal shape by a wave generator, and therefore bending stress due to flexing is produced in sections at either end of the major axis of the ellipsoidal shape. Once ellipsoidally flexed, an external gear will mesh with the internal gear in these sections at either end of the major axis, thereby giving rise to tensile stress caused by load torque transmitted via the meshing sections. For this reason, high stress is applied on the sections at either end of the major axis of the external gear (root rim sections), due to the two stresses being superimposed. As is particularly so with a low-gear-ratio strain wave gearing in which both gears have a small number of teeth, there is appreciable flexion of the external gear at the locations on the major axis; therefore, strong bending stress is produced in association with the ellipsoidal deformation. Therefore, in order to improve the transmission torque capacity of a strain wave gearing, it is necessary to reduce the stresses produced in the sections at either end of the major axis of the external gear.

In order for stresses produced in sections at either end of the major axis of the external gear to be reduced in the prior art, the maximum radial flexion (radial flexion at the major axis location) when the external gear is ellipsoidally deformed was set to a flexing amount $\kappa mn$ ($\kappa<1$) less than a standard normal flexing amount mn. Here, n is a positive integer, 2n is the difference in the number of teeth between the gears, m is the module of the two gears, and $\kappa$ is a coefficient known as the coefficient of deflection (or the coefficient of flexion). Cases in which $\kappa=1$ (normal flexion) and the flexing amount is mn, are called "non-deflection flexing." Cases in which the flexing amount $\kappa mn$ ($\kappa<1$) in the radial direction is less than mn are called "negative deflection flexing." And cases in which the flexing amount $\kappa mn$ ($\kappa>1$) in the radial direction is greater than mn are called "positive deflection flexing."

By having the external gear set to negative deflection flexing, bending stress that occurs in the sections at either end of the major axis of the external gear in association with ellipsoidal deformation is reduced. Additionally, by setting the external gear to negative deflection flexing, the center of meshing of the external gear with respect to the internal gear is shifted from the sections at either end of the major axis, thereby reducing tensile stress caused by load torque produced in the sections at either end of the major axis of the external gear. Thus, by setting the flexing amount to negative deflection, bending stress caused by flexion in the sections at either end of the major axis of the external gear is reduced, and superimposition of bending stress and tensile stress is avoided. A strain wave gearing set to negative deflection flexing was proposed by the present inventor in Patent documents 5 and 6, for example.

PRIOR ART DOCUMENT

Patent Document

Patent document 1: U.S. Pat. No. 2,906,143
Patent document 2: JP 45-41171 B
Patent document 3: JP 63-115943 A
Patent document 4: JP 64-79448 A
Patent document 5: JP 4650954 B
Patent document 6: JP 4165810 B

SUMMARY OF THE INVENTION

Problems to be Solved by the Invention

In a strain wave gearing, the tooth depth of the two gears relates to the flexing amount, and where radial flexing amount is set to be negative deflection flexing ($\kappa mn$, $\kappa<1$), which is less than the normal deflection flexing ($=mn$, $\kappa=1$), the tooth depth becomes smaller. The smaller tooth depth poses a risk that ratcheting (tooth jumping) will occur during high load torque. In order to prevent ratcheting, it is necessary to make the tooth depth of the two gears as large as possible.

From this standpoint, it would be desirable to be able to separate the superimposition of bending stress and tensile stress produced in the sections at either end of the major axis of the external gear when ellipsoidally deformed, while maintaining normal deflection flexing without making the flexing amount smaller. However, no rigorous examination has been made into ways to actively separate superimposition of bending stress and tensile stress produced in sections at either end of the major axis of the external gear.

An object of the present invention is to provide a strain wave gearing, by which superimposition of bending stress and tensile stress produced in sections at either end of the major axis of an external gear can be avoided substantially and completely, without making the flexing amount of the external gear (the average flexing amount of flexing amount at each location in the tooth trace direction) smaller than the normal flexing amount. Another object of the present invention is to provide a strain wave gearing, which is able to further increase transmission torque capacity thereof by realizing an approximately continuous meshing between an external gear and an internal gear along the tooth trace direction thereof as well as by substantially and completely avoiding superimposition of bending stress and tensile stress produced in sections at either end of the major axis of the external gear.

Means of Solving the Problems

In order to solve the above problems, in the present invention, the two stresses (bending stress and tensile stress) are separated in a substantially complete manner by making necessary corrections to the tooth profile of the flexible external gear of a strain wave gearing.

Specifically, the strain wave gearing of the present invention is provided with a rigid internal gear, a flexible external gear arranged coaxially inside the rigid internal gear, and a wave generator fitted inside the flexible external gear, wherein the external gear is ellipsoidally flexed by the wave generator, and external teeth of the ellipsoidally flexed external gear are caused to mesh with internal teeth of the internal gear in regions avoiding sections at either end in the major axis direction of the ellipsoidally flexed external gear;

The internal gear, and the external gear prior to ellipsoidal deformation, both are spur gears of module m;

the number of teeth of the external gear is fewer by 2n than the number of teeth of the internal gear, where n is a positive integer;

at a major axis location on an ellipsoidal rim neutral curve of the external gear in an axis-perpendicular cross-section at a prescribed location lying in the tooth trace direction of the external gear, radial flexing amount with respect to the rim neutral circle prior to flexion is $2\kappa mn$, where $\kappa$ is a deflection coefficient, and where an axis-perpendicular cross-section established at a prescribed location lying in the tooth trace direction of the external gear is taken as a principal cross-section, the principal cross-section is a non-deflection flexing cross-section in which the deflection coefficient $\kappa=1$;

on the basis of a movement locus of $\kappa=1$ by the teeth of the external gear with respect to the internal gear, where meshing of the external gear with respect to the internal gear in the principal cross-section is regarded as rack meshing, the tooth profile of the addendum of the internal gear is specified by the following formula a:

$x_{Ca1}=0.25\ mn(\pi+\theta-\sin\theta)$ $y_{Ca1}=0.5\ mn(-1+\cos\theta)$ (formula a)

where $0\leq\theta\leq\pi$;

the tooth profile of the addendum of the external gear is specified by the following formula b:

$x_{Fa1}=0.25\ mn[\pi-\theta+\sin\theta-\varepsilon\{\cos(\theta/2)-\sin(\theta/2)\}]$ $y_{Fa1}=mn[0.5(1-\cos\theta)-(\varepsilon/4)\{\sin(\theta/2)-\cos(\theta/2)\}]$ (formula b)

where $0\leq\varepsilon\leq0.1$ and $0\leq\theta\leq\pi$; and the tooth profiles of the dedenda of each of the internal gear and the external gear are set to any shape that does not interfere with the tooth profile of the addendum of the other gear.

In the case of a flat-type strain wave gearing, the tooth profile of the addendums of the internal gear, in axis-perpendicular cross-sections thereof along the tooth trace direction, is defined by the above formula a, and the profile of the addendums of the external gear, in axis-perpendicular cross-sections thereof along the tooth trace direction, is defined by the above formula b.

In the case of a cup-type strain wave gearing or a top-hat-type strain wave gearing, the external gear is provided with a flexible cylindrical body part, and a diaphragm extending in a radial direction from the back end of this cylindrical body part. The external teeth are formed in an outer peripheral section at the front open-end side of the cylindrical body part. The flexing amount of the external teeth changes in proportion to the distance from the diaphragm from the external-teeth inner end at the diaphragm side towards the external-teeth open end at the front open-end side in the tooth trace direction. The principal cross-section is located at the tooth-trace-direction center between the external-teeth open end and the external-teeth inner end of the external teeth.

In this case, the addendum tooth profile of the internal gear is defined by the aforementioned formula a. Whereas, the addendum tooth profile of the external gear in the principal cross-section is defined by the aforementioned formula b. The tooth profile in axis-perpendicular cross-sections, other than the principal cross-section, in the tooth trace direction in the external gear are shifted profiles in which the tooth profile of the principal cross-section is subjected to shifting according to the flexing amount of each of the axis-perpendicular cross-sections. Specifically, the tooth profiles of axis-perpendicular cross-sections of the tooth trace direction, from the principal cross-section to the external-teeth open end of the external gear, are obtained by subjecting the tooth profile of the principal cross-section to shifting, in such a way that apex portions of the $\kappa>1$ movement locus described by the tooth profile in each of the axis-perpendicular cross-sections contact apex portions of the $\kappa=1$ movement locus in the principal cross-section. The tooth profiles of axis-perpendicular cross-sections of the tooth trace direction, from the principal cross-section to the external-teeth inner end of the external gear, are obtained by subjecting the tooth profile of the principal cross-section to shifting, in such a way that nadir portions of the $\kappa<1$ movement locus described by the tooth profiles in the axis-perpendicular cross-sections contact nadir portions of the $\kappa=1$ movement locus in the principal cross-section.

Effect of the Invention

According to the present invention, it is possible to avoid superimposed flexion-induced bending stresses and tensile stresses caused by load torque arising at the major-axis locations on the ellipsoidal rim neutral curve of the external gear on an axis-perpendicular cross-section having a deflection coefficient $\kappa=1$ (principal cross-section) in the external gear of the strain wave gearing, whereby substantially and completely separating the bending stress and the tensile stresses. Therefore, the transmission torque capacity of a strain wave gearing can be improved, without the need to adopt negative deflection flexing having a deflection coefficient $\kappa<1$ in a flat-type strain wave gearing, and without the need to adopt negative deflection flexing having a deflection coefficient κ<1 along the entire tooth profile in a cup-type or top-hat-type strain wave gearing.

MODE FOR CARRYING OUT THE INVENTION

Configuration of Strain Wave Gearing

Figure 1:
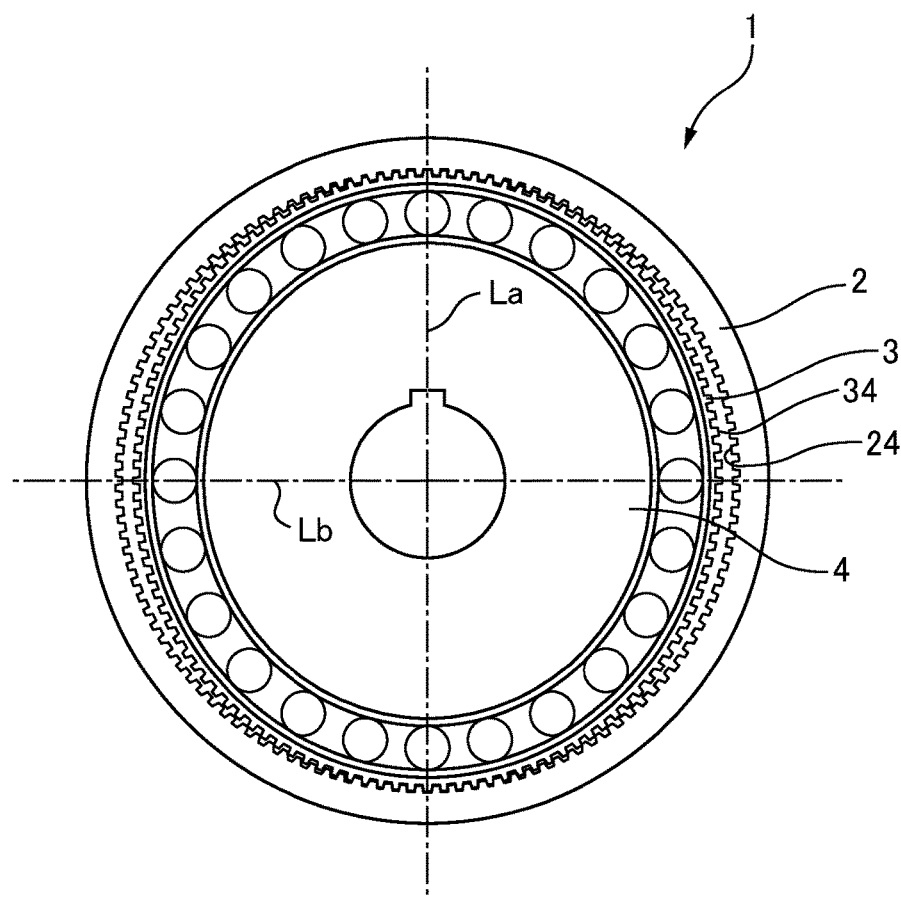
FIG. 1 is a simplified front view showing an example of a strain wave gearing according to the present invention.
Figure 2:
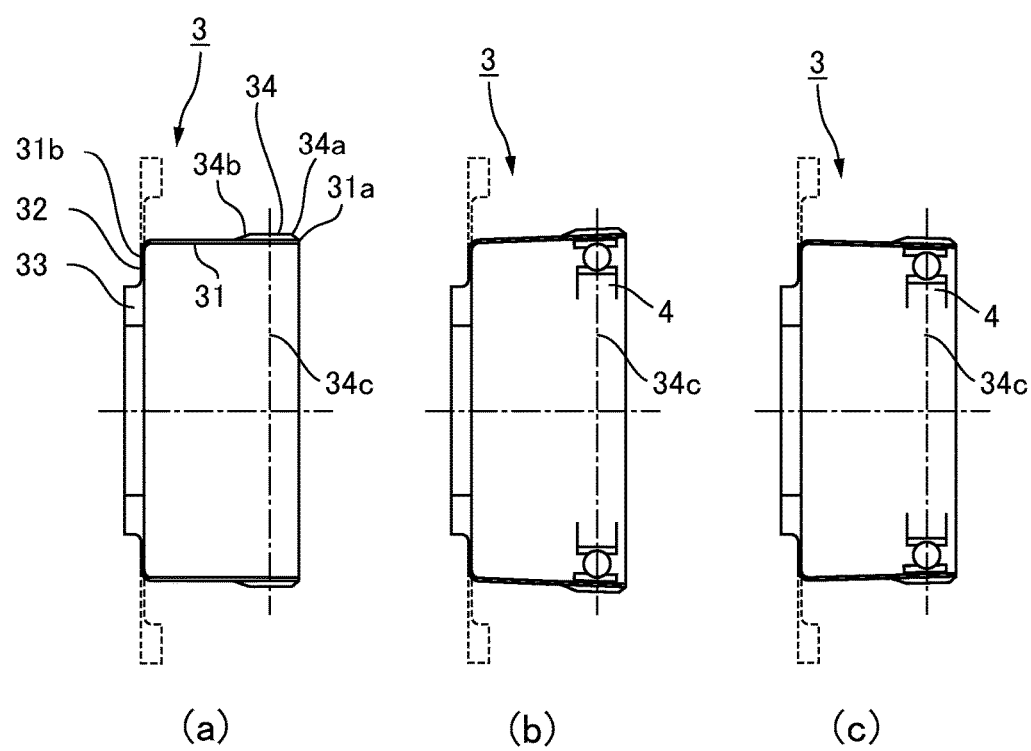
FIG. 2 is an illustrative representation of flexion conditions of an external gear of cup and top hat profiles, where (a) shows a state prior to deformation, (b) shows a state of a cross-section including the major axis of an ellipsoidally deformed external gear, and (c) shows a state of a cross-section including the minor axis of an ellipsoidally deformed external gear.

FIG. 1 is a front view of a strain wave gearing according to the present invention. FIG. 2 (a) to (c) are cross-sectional views showing conditions in which an open-end portion of a flexible external gear in the strain wave gearing is ellipsoidally flexed; FIG. 2 (a) shows a state prior to deformation, FIG. 2 (b) shows a cross-section including the major axis of an ellipsoidal curve subsequent to deformation, and FIG. 2 (c) shows a cross-section including the minor axis of an ellipsoidal curve subsequent to deformation, respectively. In FIGS. 2 (a) to (c), the solid lines represent the diaphragm and boss sections of a flexible external gear having a cup profile, and broken lines represent the diaphragm and boss sections of a flexible external gear having a top hat profile.

As shown in the drawings, the strain wave gearing 1 has an annular, rigid internal gear 2, a flexible external gear 3 arranged to the inside of the internal gear, and a wave generator 4 of ellipsoidal profile, fitted into the inside of the external gear. The internal gear 2 and the pre-deformation external gear 3 are spur gears of module m. The difference in the number of teeth between the internal gear 2 and the external gear 3 is 2n (n is a positive integer), and the circular external gear 3 of the strain wave gearing 1 is ellipsoidally flexed by the wave generator 4 of ellipsoidal profile. External teeth 34 of the external gear 3 (hereinafter, in some instances termed simply "teeth 34") and internal teeth 24 of the internal gear 2 (hereinafter, in some instances termed simply "teeth 24") mesh with one another at positions or regions apart from both end sections in the direction of a major axis La of the external gear 3 when ellipsoidally flexed.

As the wave generator 4 rotates, the location of meshing by the two gears 2, 3 moves in a circumferential direction, and the two gears 2, 3 rotate in relative fashion in accordance with the difference in the number of teeth of the gears. The external gear 31 is provided with a flexible cylindrical body part 31, a diaphragm 32 continuous with flare in a radial direction from a back end 31b which is one end of the cylindrical body part 31, a boss 33 continuous with the diaphragm 32, and the external teeth 34, which are formed in an outer peripheral surface section at a front-end opening 31a side at the other end of the cylindrical body part 31.

The ellipsoidal-profile wave generator 4 is fitted into an inner peripheral surface section of the external-teeth formation section of the cylindrical body part 31. The wave generator 4 causes the cylindrical body part 31 to undergo a gradual increase in flexion towards the outside or the inside in the radial direction, towards the front-end opening 31a from the back end 31b at the diaphragm side. As shown in FIG. 2 (b), in a cross-section that includes the major axis La of the ellipsoidal curve (see FIG. 1), the flexing amount towards the radial outside gradually increases in a substantially proportional relationship to the distance from the back end 31b to the front-end opening 31a. As shown in FIG. 2 (c), in a cross-section that includes the minor axis Lb of the ellipsoidal curve (see FIG. 1), the flexing amount towards the radial inside gradually increases in a substantially proportional relationship to the distance from the back end 31b to the front-end opening 31a. The external teeth 34 formed in an outer peripheral surface section at the front-end opening 31a side likewise experience a gradually increasing amount of flexion, substantially proportional to the distance from the back end 31b, going from an external-teeth inner end portion 34b to an external-teeth open end portion 34a in the tooth trace direction.

In an axis-perpendicular cross-section at any location in the tooth trace direction of the external gear 34, a circle passing through the center in the thickness direction of the root rim of the external gear 34 prior to ellipsoidal flexing is a rim neutral circle. On the other hand, an ellipsoidal curve passing through the center in the thickness direction of the root rim after ellipsoidal flexing is termed a "rim neutral curve." The flexing amount w in the major axis direction with respect to the rim neutral circle at a major axis location on the ellipsoidal rim neutral curve is represented by 2κmn, where κ is a deflection coefficient (a real number including 1).

Specifically, where the number of external teeth 34 of the external gear 3 is denoted by $Z_F$, the number of internal teeth 24 of the internal gear 2 by $Z_C$, and the gear ratio of the strain wave gearing 1 by R $(=Z_F/(Z_C-Z_F)=Z_F/2n)$, the value $(mZ_F/R=2\ mn)$ obtained by dividing the pitch circle diameter $mZ_F$ of the external gear 3 by the gear ratio R is the regular (standard) flexing amount $w_0$ (=2 mn) in the major axis direction. The strain wave gearing 1 is typically designed to induce flexion by the regular amount flexion $w_0$, in a region where the ball center of a wave bearing of the wave generator 4 is located in the tooth trace direction of the external gear 3, and normally at a location in a center portion in the tooth trace direction of the external gear.

The deflection coefficient κ represents a value obtained by dividing the flexing amount w in axis-perpendicular cross-sections in the tooth width direction of the external gear 3, by the regular flexing amount. Consequently, in the external gear 34, the deflection coefficient at the location at which the regular flexing amount $w_0$ is obtained is κ=1, the deflection coefficient at cross-sectional locations of lesser flexing amounts w is κ<1, and the deflection coefficient at cross-sectional locations of greater flexing amounts w is κ>1. A tooth profile with which the regular flexing amount $w_0$ (κ=1) is obtained in the external gear 34 is termed a "non-deflection tooth profile," a tooth profile with which a flexing amount less than the regular flexing amount (κ<1) is obtained is termed a "negative deflection tooth profile," and a tooth profile with which a flexing amount greater than the regular amount flexion (κ>1) is obtained is termed a "positive deflection tooth profile." In the present example, an axis-perpendicular cross-section in a center portion in the tooth trace direction of the external gear 34 is established as the principal cross-section 34c in which κ=1.

Figure 3A:
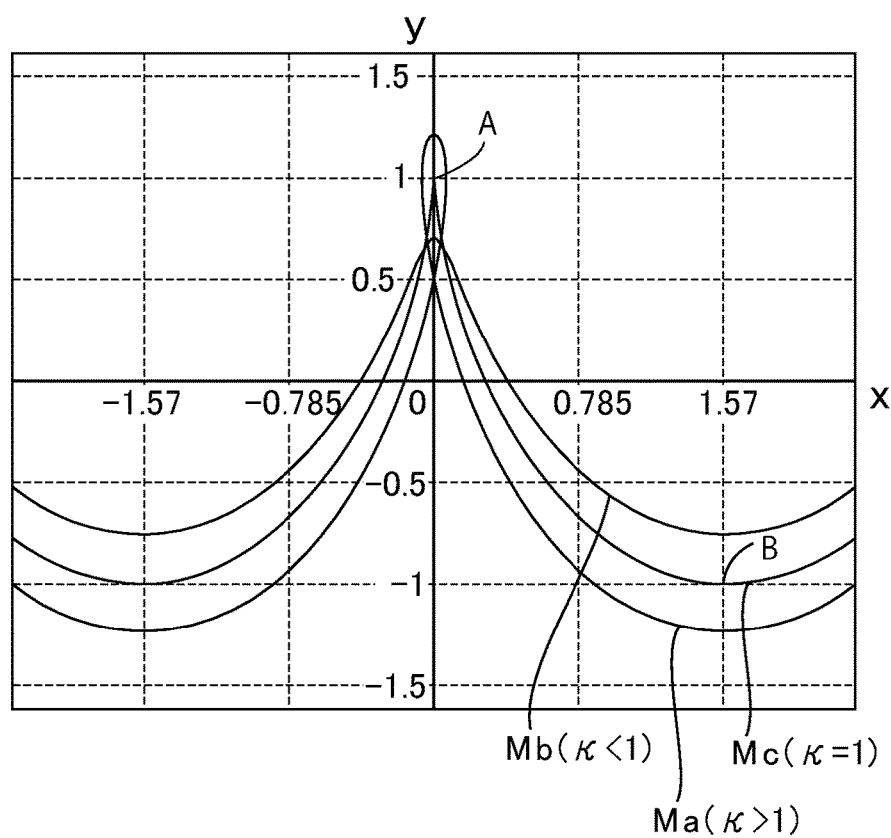
FIG. 3A is a graph showing movement loci of external gear teeth with respect to internal gear teeth, obtained in a case in which meshing of teeth of the external gear with respect to the internal gear is approximated by rack meshing, in an external-teeth inner end (κ<1), a principal cross-section (κ=1), and an external-teeth open end (κ>1) in the tooth trace direction of an external gear.

FIG. 3A is a diagram showing movement loci of the teeth 34 of the external gear 3 with respect to the teeth 24 of the internal gear 2, obtained in a case in which relative motion of the gears 2, 3 of the strain wave gearing 1 is rack approximated. In the drawing, the x axis indicates the direction of translation of the rack, and the y axis indicates a direction perpendicular thereto. The origin of the y axis is the average position of amplitude of the movement loci. Curve Ma is a movement locus obtained at the external-teeth open end portion 34a, and curve Mb is a movement locus obtained at the external-teeth inner end portion 34b. Curve Mc is a movement locus obtained at any location from the external-teeth open end portion 34a to the external-teeth inner end portion 34b in the tooth trace direction, and in the present example is obtained in a center portion in the tooth trace direction. The axis-perpendicular cross-section at this location is referred to hereinafter as "principal cross-section 34c." The movement locus of the teeth 34 of the external gear 3 with respect to the teeth 24 of the internal gear is given by the following formulas.

$x_{Fa}=0.5\ mn(\theta-\kappa \sin \theta)$ $y_{Fa}=\kappa mn \cos \theta$

To simplify the description, the above formulas are represented by the following formula (1), where module m=1 and n=1 (difference in number of teeth 2n=2).

$x_{Fa}=0.5(\theta-\kappa \sin \theta)$ $y_{Fa}=\kappa \cos \theta$ (Formula 1)

Method for Forming Tooth Profile in Principal Cross-Section

A tooth profile of the addendums of the internal teeth 24 in the principal cross-section 34c (deflection coefficient κ=1), afforded by rack approximation, will be described. The movement locus Mc obtained in the principal cross-section 34c in the external gear 34 is utilized in order to specify the addendum profile of the internal teeth 24 in the principal cross-section 34c.

First, in the movement locus Mc in the principal cross-section 34c of FIG. 3A, a first curve AB for which the range of parameter θ is π to 0 is selected. The location at which the parameter θ=π is point B, which is the nadir point of the movement locus Mc; point A at which the parameter θ=0 is the apex point of the movement locus Mc. Subsequently, a λ-fold (0<λ<1) similarity transformation of the first curve AB with point B as the center of similarity gives a first similarity curve BC (see FIG. 4A). The first similarity curve BC is utilized as the addendum profile for the teeth 24 of the rigid internal gear 2. In the present example, λ is 0.5.

The addendum profile for the teeth 24 of the internal gear 2 established in this manner is given by the following formula 2.

$x_{Ca1}=0.5\{(1-\lambda)\pi+\lambda(\theta-\kappa \sin \theta)\}$ $y_{Ca1}=\kappa\{\lambda(1+\cos \theta)-1\}$ (Formula 2)

where $0\leq\theta\leq\pi$.

Figure 4A:
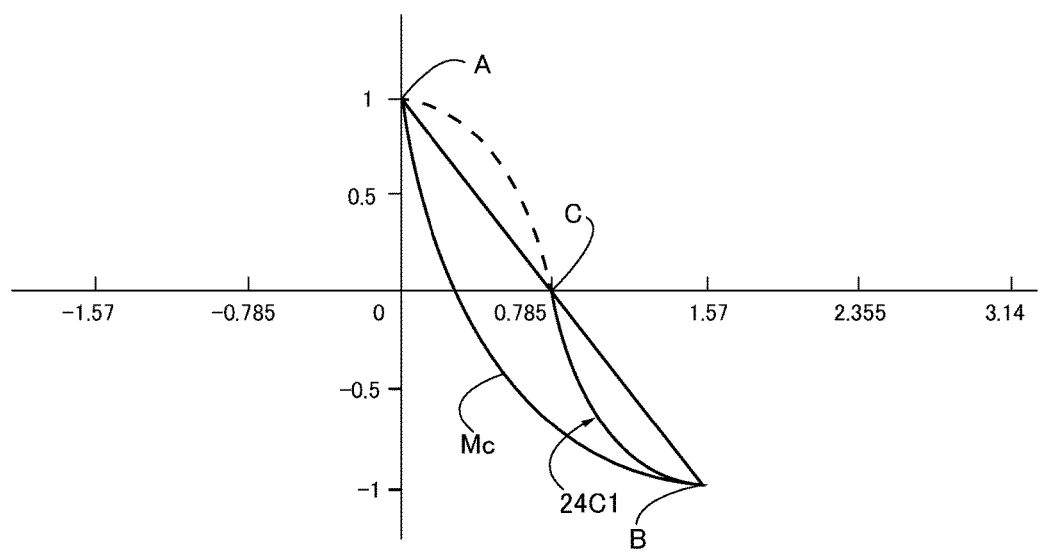
FIG. 4A is an illustrative representation of a tooth profile of an addendum of an internal gear.

Since λ=0.5 and κ=1, substituting these into formula 2 gives formula 2A. FIG. 4A shows a first similarity curve BC given by formula 2A, the curve being an addendum tooth profile curve 24C1 for the internal gear 2.

Internal Gear Addendum Profile $x_{Ca1}=0.25(\pi+\theta-\sin \theta)$ $y_{Ca1}=0.5(-1+\cos \theta)$ (Formula 2A)

where $0\leq\theta\leq\pi$

Subsequently, the first similarity curve BC undergoes 180° rotation and (1−λ)-fold similarity transformation, with point C, which is the end point at the opposite side from point B in the first similarity curve BC, as the center, to obtain a second similarity curve. The second similarity curve is given by the following formula 3.

$x(\theta)=0.5\{(1-\lambda)(\pi-\theta+\kappa \sin \theta)\}$ $y(\theta)=\kappa\{(\lambda-1)(1-\cos \theta)\}$ (Formula 3)

where $0\leq\theta\leq\pi$

Since λ=0.5 and κ=1, substituting these into formula 2 gives formula 3A. The second similarity curve CA given by the formula 3A is shown by dotted line in FIG. 4A.

$x(\theta)=0.25(\pi-\theta+\sin \theta)\}$ $y(\theta)=0.5(1-\cos \theta)$ (Formula 3A)

where $0\leq\theta\leq\pi$

External Gear Addendum Profile

Figure 4B:
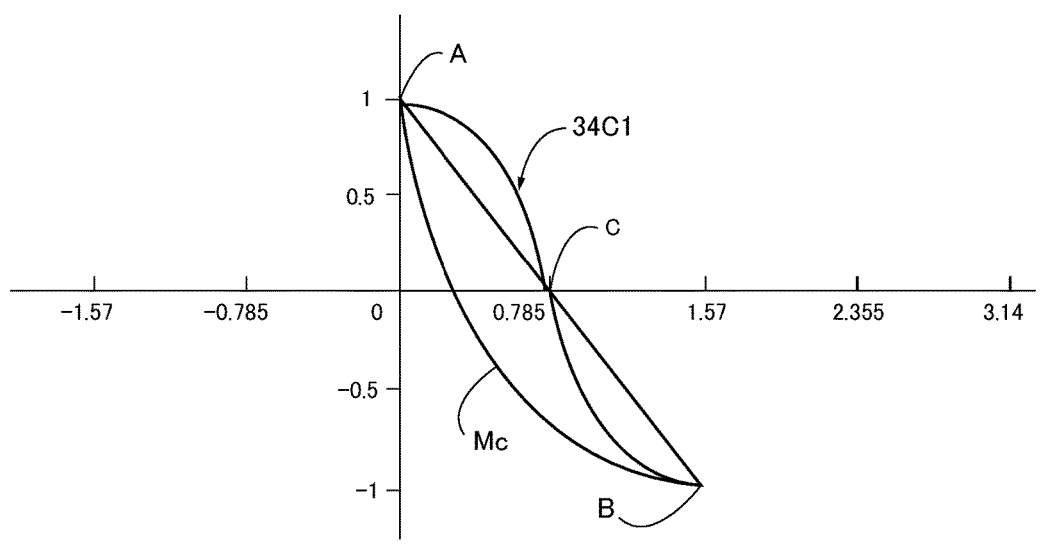
FIG. 4B is an illustrative representation of a tooth profile of an addendum in a principal cross-section of an external gear.

Here, the addendum profile of the external gear 34 is specified by the following formula 3B. FIG. 4B shows an addendum profile curve 34C1 given by formula 3B.

$$x_{Fa1}=0.25[\pi-\theta+\sin\theta-\varepsilon\{\cos(\theta/2)-\sin(\theta/2)\}]$$

$$y_{Fa1}=0.5(1-\cos\theta)-(\varepsilon/4)\{\sin(\theta/2)-\cos(\theta/2)\} \quad \text{(Formula 3B)}$$

where $0\leq\varepsilon\leq0.1$ and $0\leq\theta\leq\pi$

In formula 3B, meshing of the external gear 3 with the internal gear 2 at the major axis La of the ellipsoidal rim neutral curve is eliminated by introducing the correction term including $\varepsilon$ so that, at the major axis La, only bending stress due to ellipsoidal flexion is substantially present. The peak of tensile stress due to transmission torque load appears at the center position ($\theta=\pi/4$) between the major axis La and the minor axis Lb, which means that the tensile stress is not substantially generated on the major axis La. Therefore, it is possible to substantially avoid superimposition of the bending stress and the tensile stress on the both end sections of the major axis of the external gear 3 (namely, regions where these stresses are generated can be separated substantially and completely.

Example of Internal Gear Dedendum Profile

Figure 4C:
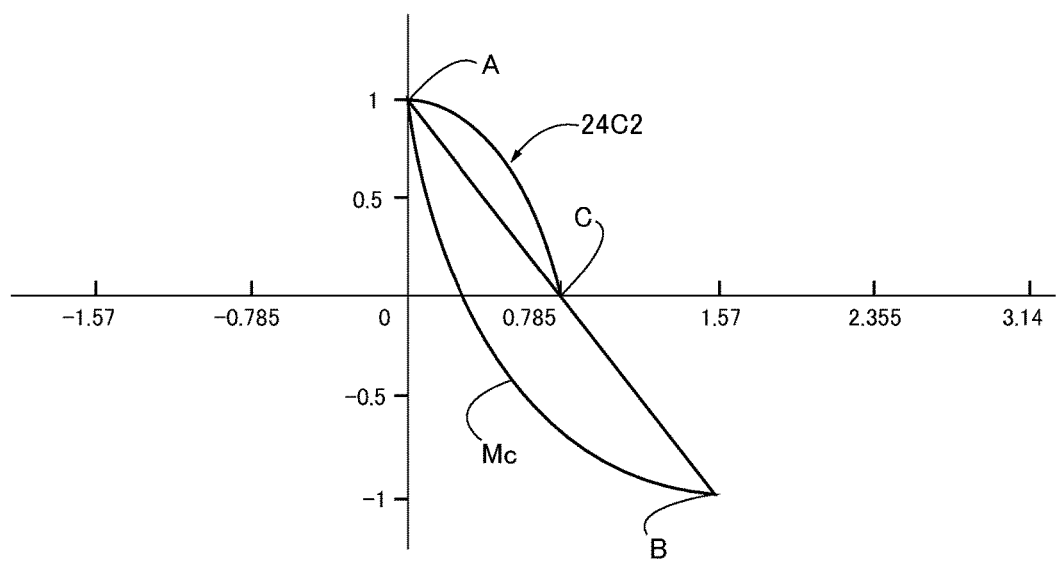
FIG. 4C is an illustrative representation of an example of a tooth profile of a dedendum of an internal gear.

The dedendum profile of each of the two gears 2, 3 may be any profile that does not give rise to interference with the addendum profile of the counterpart gear. For example, the dedendum profile of the internal gear 2 can be such that a curve created in the internal gear 2 during the interval that the addendum profile of the external gear 3 moves from the apex point to the nadir point of the movement locus Mc is defined as the dedendum profile of maximum tooth thickness of the internal gear 2. This dedendum profile is given by the following formula 4. FIG. 4C shows a dedendum profile curve 24C2 given by formula 4.

$$x_{Ca2}=0.25(\pi-\theta+\sin\theta)$$

$$y_{Ca2}=0.5(1-\cos\theta)\} \quad \text{(Formula 4)}$$

where $0\leq\theta\leq\pi$

Figure 4D:
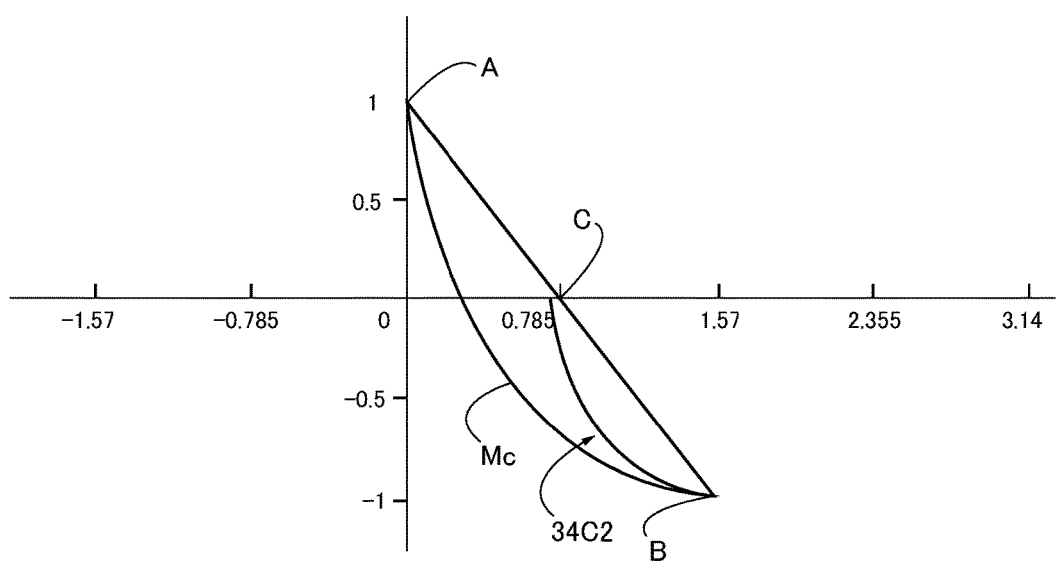
FIG. 4D is an illustrative representation of an example of a tooth profile of a dedendum of an external gear.

Likewise, the curve that the addendum profile of the internal gear 2 creates in the external gear 3 during the interval that the addendum profile of the external gear 3 moves from the apex point to the nadir point of the movement locus Mc can be defined as the dedendum profile of maximum tooth thickness of the external gear 3. This dedendum profile is given by the following formula 5. FIG. 4D shows a dedendum profile curve 34C2 given by formula 5.

$$x_{Fa2}=0.25[\pi-\theta+\sin\theta-\varepsilon\{\cos(\theta/2)-\sin(\theta/2)\}]$$

$$y_{Fa2}=0.5(-1+\cos\theta)-(\varepsilon/4)\{\sin(\theta/2)-\cos(\theta/2)\} \quad \text{(Formula 5)}$$

where $0\leq\varepsilon\leq0.1$ and $0\leq\theta\leq\pi$

Figure 4E:
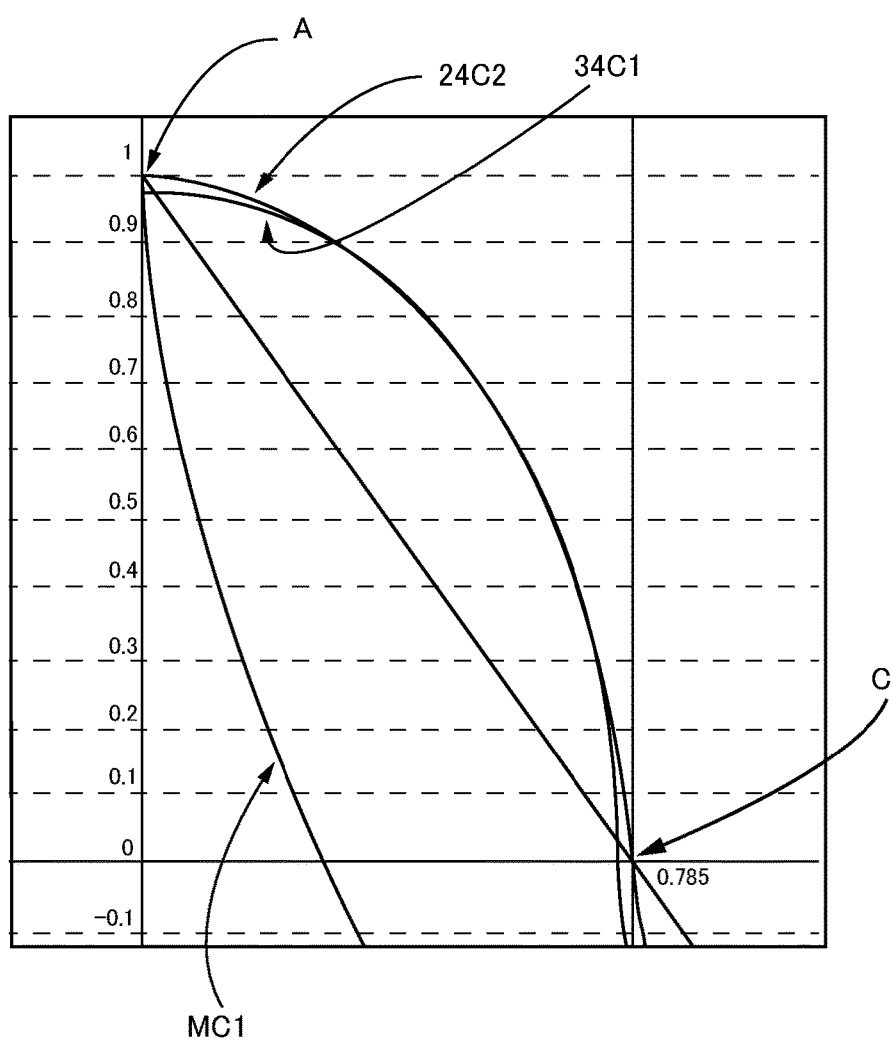
FIG. 4E is an illustrative representation of an example of a tooth profile of a dedendum of an internal gear.

FIG. 4E shows, in an enlarged manner, the dedendum profile of the internal gear 2 defined by the profile curve 24C2 and the addendum profile of the external gear 3 defied by the profile curve 34C1, in which profile modification applied to the addendum profile of the external gear 3 is depicted.

Figure 5:
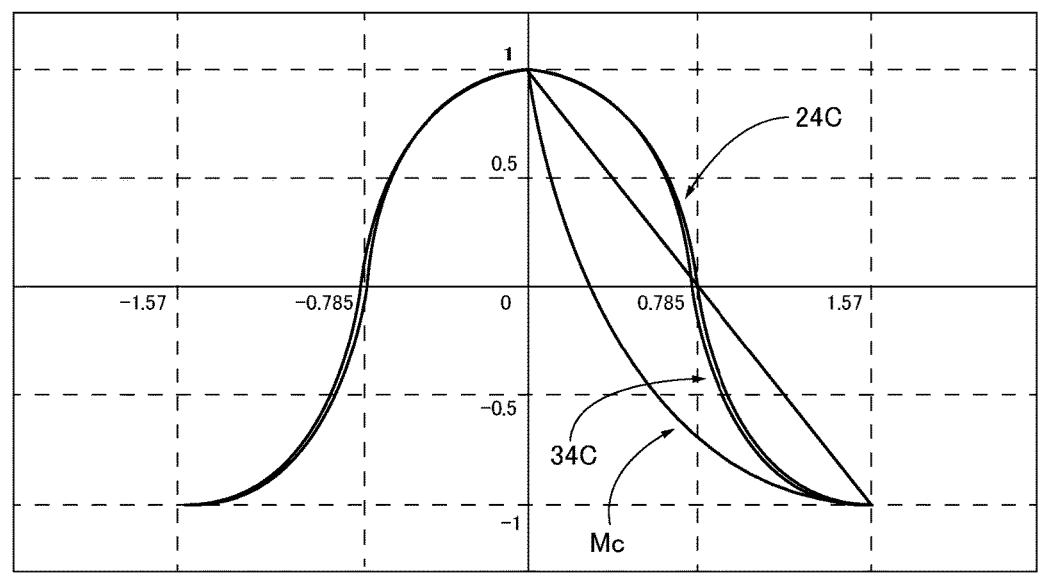
FIG. 5 is an illustrative representation of tooth profiles of an external gear and an internal gear in a principal cross-section.

FIG. 5 shows an external tooth profile 34C and an internal tooth profile 24C defined by meshing of the aforementioned individual tooth profiles in the principal cross-sections 34c of the external gear and the internal gear.

Tooth Profiles in Axis-Perpendicular Cross-Sections Other than Principal Cross-Sections In a flat-type strain wave gearing, the tooth profiles of axis-perpendicular cross-sections in the tooth trace direction of the internal gear 2 and the external gear 3 are the same as the tooth profiles in the principal cross-section 34c established as described above.

By contrast, in a cup-type strain wave gearing or a top-hat-type strain wave gearing, tooth profiles of axis-perpendicular cross-sections in the tooth trace direction of the internal gear 2 are identical to the tooth profile at the location of the principal cross-section 34c established as described above. However, tooth profiles of axis-perpendicular cross-sections other than the principal cross-section 34c in the tooth trace direction of the external gear 3 are shifted profiles in which the tooth profile of the principal cross-section 34c has been subjected to shifting according to the flexing amount of each axis-perpendicular cross-section.

Specifically, the tooth profiles of axis-perpendicular cross-sections in the tooth trace direction from the principal cross-section 34c to the external-teeth open end portion 34a of the external gear 3 are tooth profiles obtained when the external tooth profile 34C of the principal cross-section 34c undergoes shifting such that apex portions of $\kappa>1$ movement loci described by the external teeth 34 in axis-perpendicular cross-sections contact an apex portion of the $\kappa=1$ movement locus in the principal cross-section 34c. The tooth profiles of axis-perpendicular cross-sections in the tooth trace direction from the principal cross-section 34c to the external-teeth inner end portion 34b of the external teeth 34c are tooth profiles obtained when the external tooth profile 34C of the principal cross-section 34c undergoes shifting such that nadir portions of $\kappa<1$ movement loci described by the external teeth 34 in axis-perpendicular cross-sections contact a nadir portion of the $\kappa=1$ movement locus in the principal cross-section 34c.

Figure 3B:
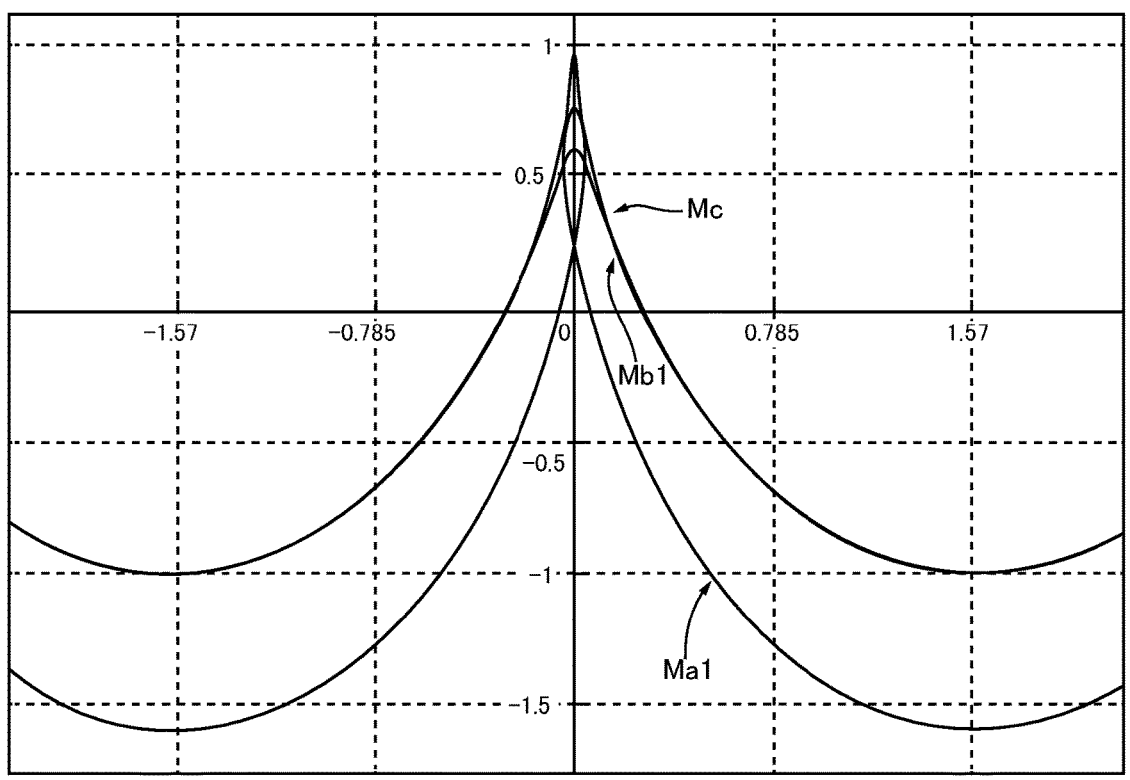
FIG. 3B is a graph showing movement loci of external gear teeth with respect to internal gear teeth, obtained in a case in which meshing of teeth of the external gear with respect to the internal gear is approximated by rack meshing, in an external-teeth inner end (κ<1), a principal cross-section (κ=1) and an external-teeth open end (κ>1) in the trace direction of an external gear after being subjected to shifting.

In specific terms, tooth profiles of cross-sections in the tooth trace direction, other than the principal section, in the external gear 3 are established as follows. As shown in FIG. 3B, in axis-perpendicular cross-sections at locations from the principal cross-section 34c to the external-teeth open end portion 34a, in which the deflection coefficient is $\kappa>1$, the amount of shifting h of the teeth 34 of the external gear 3 is given by the following formulas 6, such that an apex portion of a movement locus Ma1 derived by rack approximation of the teeth 34 of the external gear 3 with respect to the teeth 24 of the internal gear contacts a movement locus Mc in the principal cross-section 34c.

$$h=\lambda(\kappa)(\kappa-1) \quad \text{(Formulas 6)}$$

As noted above, a rack-approximated movement locus of the teeth 34 of the external gear 3 with respect to the teeth 24 of the internal gear 2 in axis-perpendicular cross-sections of the external gear in which the deflection coefficient $\kappa$ is 1 or greater is indicated by the following formula.

$$x_{Fa}=0.5(\theta-\kappa\sin\theta)$$

$$y_{Fa}=\kappa\cos\theta \quad \text{(Formula A)}$$

A pressure angle $\alpha_\kappa$ of a tangent to a movement locus, with respect to a point on the movement locus, is indicated by the following formula.

$$\tan\alpha_\kappa=0.5(1-\kappa\cos\theta_\kappa)/\kappa\sin\theta_\kappa \quad \text{(Formula B)}$$

A pressure angle $\alpha_1$ of a tangent with respect to a point on the $\kappa=1$ movement locus is indicated by the following formula.

$$\tan\alpha_1=0.5(1-\cos\theta_1)/\sin\theta_1 \quad \text{(Formula C)}$$

The pressure angles are thereby equated to obtain the following formula.

$$(1-\kappa \cos \theta_\kappa)/\kappa \sin \theta_\kappa - (1-\cos \theta_1)/\sin \theta_1 = 0 \quad \text{(Formula D)}$$

Next, the x coordinates of the contact points are equated to obtain the following formula.

$$\theta_\kappa - \kappa \sin \theta_\kappa - \theta_1 + \sin \theta_1 = 0 \quad \text{(Formula E)}$$

Here, by simultaneously solving formula D and formula E, and calculating $\theta_\kappa$ and $\theta_1$, the amount of shifting h is calculated from the following formula.

$$h = \kappa \cos \theta_\kappa - \cos \theta_1$$

$$\lambda(\kappa) = h/(\kappa-1) \quad \text{(Formula F)}$$

Next, in axis-perpendicular cross-sections situated at locations from the principal cross-section 34c to the external-teeth inner end portion 34b of the external gear 3 and in which the deflection coefficient is $\kappa<1$, the teeth 34 of the external gear 3 are shifted such that a nadir portion of a movement locus Mb1 of the teeth 34 of the external gear 3 with respect to the teeth 24 of the internal gear 2 contacts a nadir portion of the movement locus Mc in the principal cross-section 34c, as shown in FIG. 3B. The magnitude of shifting at this time is given by the following formula.

$$h = \kappa - 1$$

Figure 6:
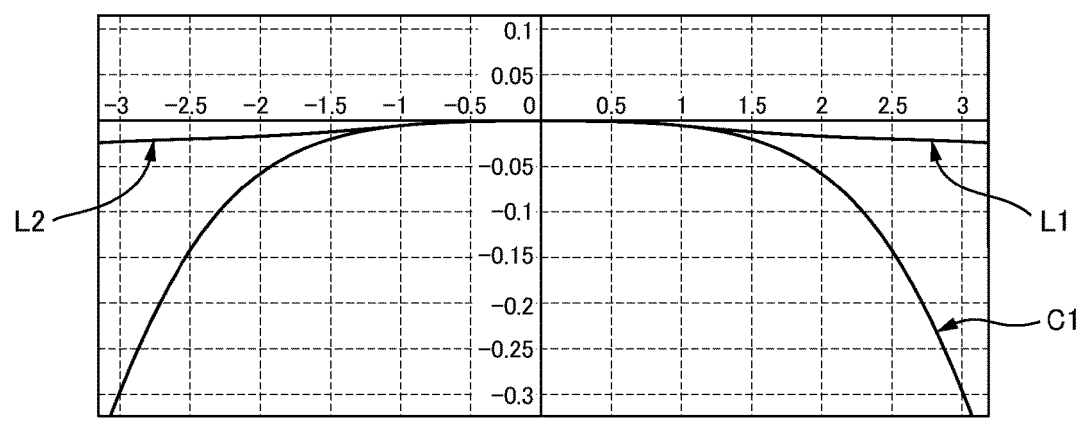
FIG. 6 is a graph showing an example of the amount of shifting near a principal cross-section in the tooth trace direction of an external gear.

FIG. 6 is a graph showing an example of the amount of shifting near the principal cross-section in the tooth trace direction of the external gear 3. The horizontal axis in the drawing indicates the distance from the center portion in the tooth trace direction of the external teeth 34 (the principal cross-section 34c), and the vertical axis indicates the amount of shifting h. The amount of shifting h is indicated by straight shifting lines L1, L2 of identical slope. The straight shifting line L1 indicates the amount of shifting from the principal cross-section 34 to the external-teeth open end portion 34a, and the straight shifting line L2 indicates the amount of shifting from the principal cross-section 34 to the external-teeth inner end portion 34b.

A quartic curve C1 having the principal cross-section 34c as the apex point and contacting the straight shifting lines L1, L2 is also shown in FIG. 6. When amounts of shifting in axis-perpendicular cross-sections are determined on the basis of this quartic curve C1, a substantially flat portion is formed in a center portion in the tooth trace direction that includes the principal cross-section 34c of the external gear 34. In so doing, smoothly varying shifting is ensured, and dimension management during cutting of the external gear 3 is facilitated.

Figure 7:
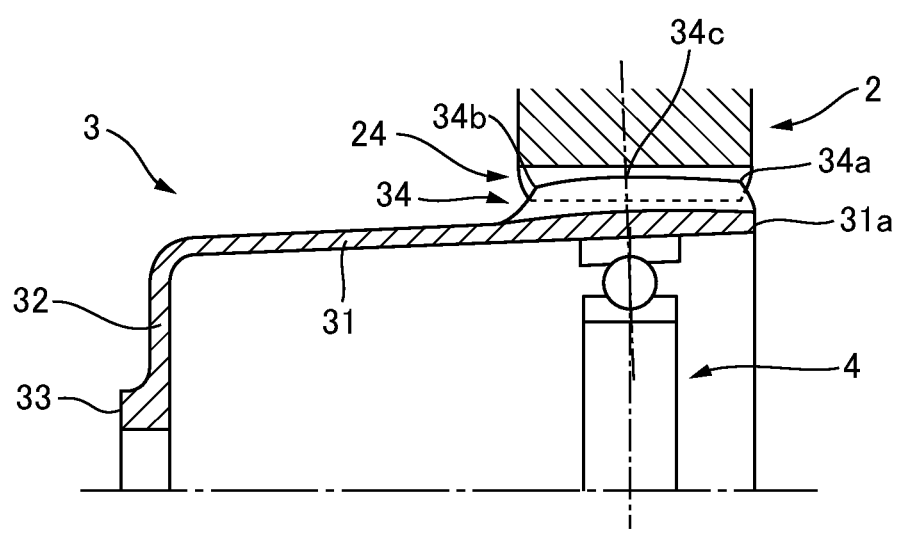
FIG. 7 is an illustrative representation of tooth profile contours in the tooth trace direction of an external gear having undergone shifting.

FIG. 7 is an illustrative representation of the tooth profile outlines of the inner gear 24 and the external gear 34, in which the tooth profile outline of the external gear in the tooth trace direction has undergone shifting in the aforedescribed manner. In the drawing, a state in a cross-section that includes the major axis with the gears 2, 3 in a meshed state (state of maximum-depth meshing) is shown. In a center portion in the tooth trace direction that includes the principal cross-section 34c, the tooth profile outline in the tooth trace direction of the external gear 34 is specified by the aforedescribed quartic curve C1, the tooth profile outline in a section from this center portion to the external-teeth open end portion 34a is defined by the straight shifting line L1, and the tooth profile outline in a section from this center portion to the external-teeth inner end portion 34b is defined by the straight shifting line L2.

Figure 8:
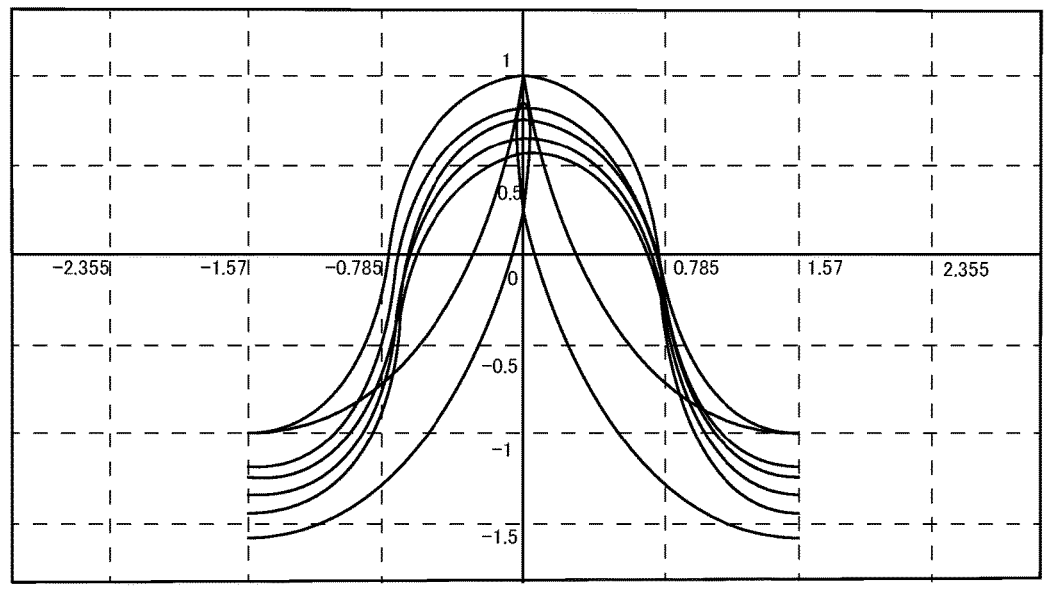
FIG. 8 is an illustrative representation of meshing of external gear teeth with respect to internal gear teeth in an external-teeth open end of an external gear.
Figure 9A:
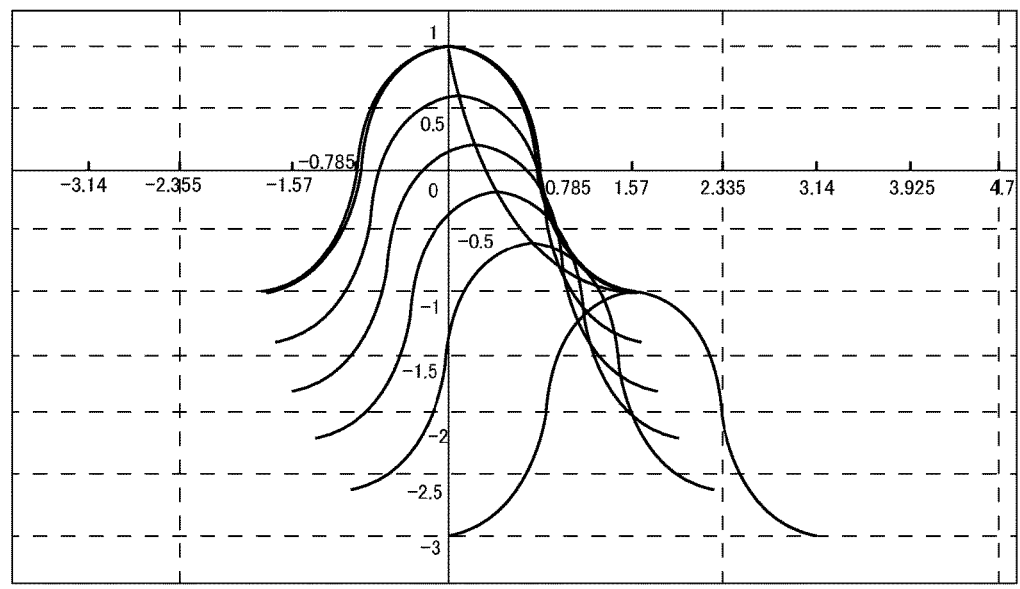
FIG. 9 is (a) an illustrative representation of meshing of external gear teeth with respect to internal gear teeth in a principal cross-section of an external gear, and (b) a partial enlarged view thereof.
Figure 9B:
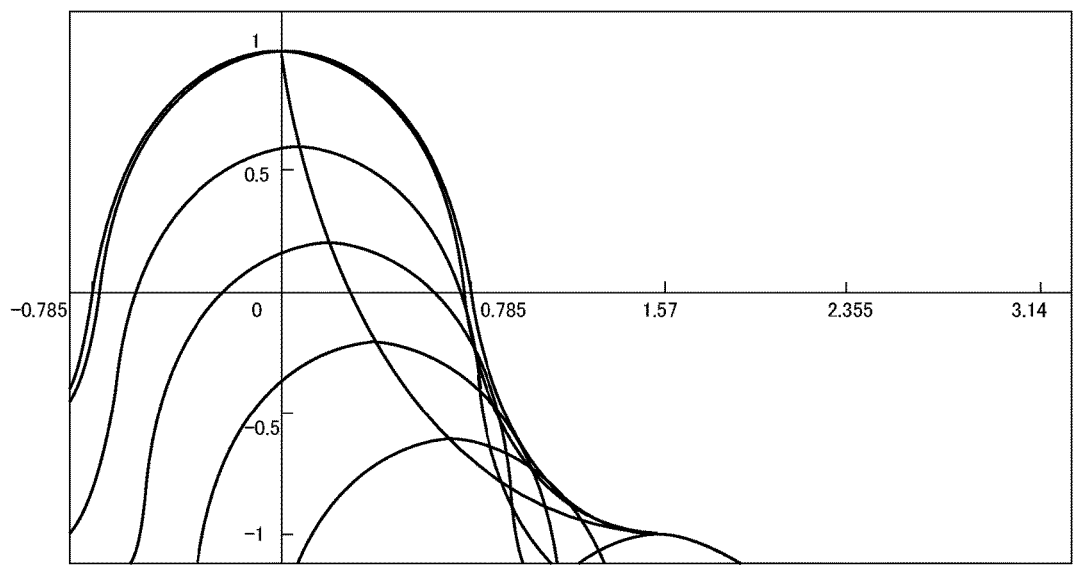
Figure 10:
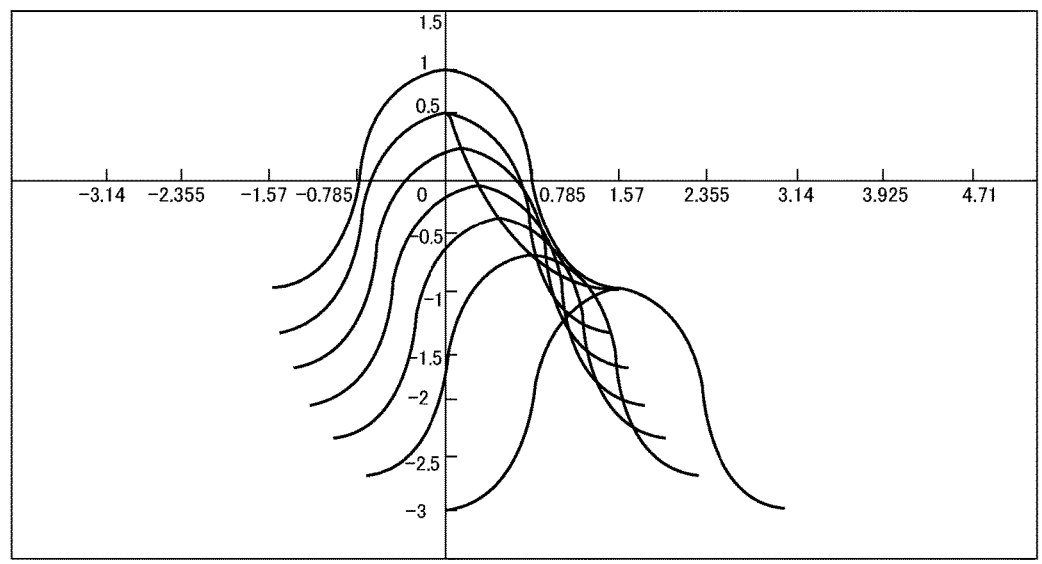
FIG. 10 is an illustrative representation of meshing of external gear teeth with respect to internal gear teeth in an external-teeth open end of an external gear.

FIGS. 8-10 are descriptive diagrams showing, by rack approximation, the condition of meshing of the external teeth 34 with respect to the internal teeth 24 having tooth profiles established in the aforedescribed manner. FIG. 8 shows meshing of the external teeth 34 with respect to the internal teeth 24 in the external-teeth open end portion 34a of the external gear 34. FIG. 9 (a) shows analogous meshing in the principal cross-section 34c of the external gear 34, and FIG. 9 (b) is a partial enlarged view thereof. FIG. 10 shows analogous meshing in the external-teeth inner end portion 34b of the external gear 34.

As will be understood from the drawings, while approximate, at locations from the external-teeth open end portion 34a to the external-teeth inner end portion 34b of the external gear 3, the tooth profiles make effective contact, centered on the principal cross-section 34c.

As described above, in the present example, by making necessary corrections to the tooth profile of the flexible external gear 3 of the strain wave gearing 1, in an axis-perpendicular cross-section having a deflection coefficient of $\kappa=1$ (the principal cross-section 34c), the location of meshing of the external gear 3 with respect to the internal gear 2 in the external gear 3 is moved away from the location of the major axis La of the ellipsoidal rim neutral curve of the external gear 3, and gradual meshing commences. In so doing, superimposition of bending stress produced by flexion, and tensile stress caused by load torque, arising at major axis locations of the ellipsoidal rim neutral curve of the external gear as encountered in the prior art, can be avoided.

In particular, the positions where the two stresses (bending stress and tensile stress) arise can be separated substantially and completely, whereby the transmission torque capacity of the strain wave gearing can be improved, without the need to adopt negative deflection flexing having a deflection coefficient of $\kappa<1$ in a flat-type strain wave gearing, or to adopt negative deflection flexing having a deflection coefficient of $\kappa<1$ along the entire tooth profile in a cup-type or top-hat-type strain wave gearing.

Further, according to the present invention, tooth shifting is adopted for the external gear other than principal cross-section thereof, whereby realizing continuous meshing between the external gear and the internal gear along the tooth trace direction in a cup-type or top-hat-type strain wave gearing. This can further increase the transmission torque capacity of a strain wave gearing.

The invention claimed is:

1. A strain wave gearing comprising:
    a rigid internal gear, a flexible external gear arranged coaxially inside of the rigid internal gear, and a wave generator fitted inside the flexible external gear;
    wherein the external gear is flexed into an elliptical shape by the wave generator, and external teeth of the ellipsoidally flexed external gear mesh with internal teeth of the internal gear in regions avoiding sections at opposite ends of the ellipsoidally flexed external gear in a major axis direction thereof;
    the internal gear, and the external gear, both are spur gears of module m;
    a number of teeth of the external gear is fewer by 2n than a number of teeth of the internal gear, where n is a positive integer;
    at a location along the major axis on an ellipsoidal rim neutral curve of the external gear in an axis-perpendicular cross-section at a predetermined location along a tooth trace direction of the external gear, a radial flexing amount with respect to a rim neutral circle prior to flexion is $2\kappa mn$, where $\kappa$ is a deflection coefficient, and where an axis-perpendicular cross-section established at a predetermined location lying in the tooth trace direction of the external gear is a principal cross-section, the principal cross-section being a non-deflection cross-section in which the deflection coefficient κ=1;

a movement locus where the deflection coefficient κ=1 by the teeth of the external gear with respect to the internal gear, and where meshing of the external gear with respect to the internal gear in the principal cross-section comprises rack meshing;

a tooth profile of an addendum of the internal gear is specified by the following formula a, $$x_{Ca1} = 0.25 \, mn(\pi + \theta - \sin\theta)$$

$$y_{Ca1} = 0.5 \, mn(-1 + \cos\theta) \quad \text{(formula a)}$$

where $0 \leq \theta \leq \pi$;

a tooth profile of an addendum of the external gear is specified by the following formula b, $$x_{Fa1} = 0.25 \, mn[\pi - \theta + \sin\theta - \varepsilon\{\cos(\theta/2) - \sin(\theta/2)\}]$$

$$y_{Fa1} = mn[0.5(1 - \cos\theta) - (\varepsilon/4)\{\sin(\theta/2) - \cos(\theta/2)\}] \quad \text{(formula b)}$$

where $0 \leq \varepsilon \leq 0.1$ and $0 \leq \theta \leq \pi$; and the tooth profiles of dedenda of each of the internal gear and the external gear are set to any shape that does not interfere with the tooth profile of the addendum of the other gear.

2. The strain wave gearing according to claim 1, wherein a dedendum profile of the internal gear at a location of its maximum tooth thickness is given by the following formula c, $$x_{Ca2} = 0.25 \, mn(\pi - \theta + \sin\theta)$$

$$y_{Ca2} = 0.5 \, mn(1 - \cos\theta)\} \quad \text{(Formula c)}$$

where $0 \leq \theta \leq \pi$; and a dedendum profile of the external gear at a location of its maximum tooth thickness is given by the following formula d, $$x_{Fa2} = 0.25 \, mn[\pi - \theta + \sin\theta - \varepsilon\{\cos(\theta/2) - \sin(\theta/2)\}]$$

$$y_{Fa2} = mn[0.5(-1 + \cos\theta) - (\varepsilon/4)\{\sin(\theta/2) - \cos(\theta/2)\}] \quad \text{(Formula d)}$$

where $0 \leq \varepsilon \leq 0.1$ and $0 \leq \theta \leq \pi$.

3. The strain wave gearing according to claim 1, wherein tooth profiles of an addendum of axis-perpendicular cross-sections along the tooth trace direction of the internal gear are defined by the above formula a; and tooth profiles of addendum of axis-perpendicular cross-sections in the tooth trace direction of the external gear are defined by the above formula b.

4. The strain wave gearing according to claim 1, wherein the external gear has a flexible cylindrical body part, and a diaphragm extending in a radial direction from a back end of the cylindrical body part, the external teeth being formed in an outer peripheral section at a front open-end side of the cylindrical body part;

a flexing amount of the external teeth changes relative to a distance from the diaphragm from an end of the external teeth adjacent the diaphragm towards an open end of the external teeth at the front open-end side in the tooth trace direction;

the principal cross-section is located at a center along the tooth-trace-direction between the external-teeth open end and the external-teeth inner end of the external teeth;

the tooth profile of the external gear in the principal cross-section is defined by an addendum profile that is defined by the above formula b; and the tooth profile in axis-perpendicular cross-sections, other than the principal cross-section, along the tooth trace direction in the external gear are shifted profiles in which the tooth profile of the principal cross-section is subjected to shifting according to the flexing amount of each of the axis-perpendicular cross-sections, and wherein the tooth profiles of axis-perpendicular cross-sections of the tooth trace direction, from the principal cross-section to the external-teeth open end of the external gear, are obtained by subjecting the tooth profile of the principal cross-section to shifting, in such a way that apex portions of the movement locus where the deflection coefficient κ>1 described by the tooth profile in each of the axis-perpendicular cross-sections contact apex portions of the movement locus where the deflection coefficient κ=1 in the principal cross-section; and the tooth profiles of axis-perpendicular cross-sections of the tooth trace direction, from the principal cross-section to the external-teeth inner end of the external gear, are obtained by subjecting the tooth profile of the principal cross-section to shifting, in such a way that nadir portions of the movement locus where the deflection coefficient κ<1 described by the tooth profiles in the axis-perpendicular cross-sections contact nadir portions of the movement locus where the deflection coefficient κ=1 in the principal cross-section.

5. The strain wave gearing according to claim 4, wherein the tooth profiles of axis-perpendicular cross-sections of the tooth trace direction, from the principal cross-section to the external-teeth open end of the external gear, are obtained by shifting the tooth profile of the principal cross-section, the amount of shifting being defined by the following formula, $$h = \kappa \cos\theta_\kappa - \cos\theta_1,$$

where values of $\theta_\kappa$ and $\theta_1$ are solutions of the following simultaneous equations, $$(1 - \kappa \cos\theta_\kappa)/\kappa \sin\theta_\kappa - (1 - \cos\theta_1)/\sin\theta_1 = 0$$

$$\theta_\kappa - \kappa \sin\theta_\kappa - \theta_1 + \sin\theta_1 = 0.$$

6. The strain wave gearing according to claim 5, wherein the tooth profiles of axis-perpendicular cross-sections along the tooth trace direction, from the principal cross-section to the external-teeth inner end of the external gear, are obtained by shifting the tooth profile of the principal cross-section, the amount of shifting being defined by the following formula, $$h = \kappa - 1.$$

* * * * *